United States Patent
Guthmuller et al.

(10) Patent No.: US 9,330,006 B2
(45) Date of Patent: May 3, 2016

(54) SYSTEM AND METHOD FOR MANAGING CORRESPONDENCE BETWEEN A CACHE MEMORY AND A MAIN MEMORY

(71) Applicant: Commissariat a l'energie atomique et aux ene alt, Paris (FR)

(72) Inventors: Eric Guthmuller, Ruy (FR); Ivan Miro Panades, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 128 days.

(21) Appl. No.: 14/371,321

(22) PCT Filed: Jan. 11, 2013

(86) PCT No.: PCT/FR2013/050076
§ 371 (c)(1),
(2) Date: Jul. 9, 2014

(87) PCT Pub. No.: WO2013/104875
PCT Pub. Date: Jul. 18, 2013

(65) Prior Publication Data
US 2015/0046657 A1    Feb. 12, 2015

(30) Foreign Application Priority Data
Jan. 13, 2012  (FR) ..................... 12 50349

(51) Int. Cl.
*G06F 12/10* (2006.01)
*G06F 12/08* (2016.01)

(52) U.S. Cl.
CPC ........ *G06F 12/0848* (2013.01); *G06F 12/0846* (2013.01); *G06F 12/0864* (2013.01); *G06F 2212/282* (2013.01); *G06F 2212/601* (2013.01)

(58) Field of Classification Search
CPC ............ G06F 12/0848; G06F 12/0864; G06F 12/0846
USPC ........................................................ 711/129
See application file for complete search history.

(56) References Cited

U.S. PATENT DOCUMENTS

| | | | |
|---|---|---|---|
| 5,572,700 A | 11/1996 | Hays et al. | |
| 6,351,788 B1 | 2/2002 | Yamazaki et al. | |

(Continued)

FOREIGN PATENT DOCUMENTS

| | | |
|---|---|---|
| GB | 2 412 987 A | 10/2005 |
| WO | WO 2006/078837 A2 | 7/2006 |

OTHER PUBLICATIONS

International Search Report issued Mar. 15, 2013 in PCT/FR2013/050076.

(Continued)

*Primary Examiner* — Jae Yu
(74) *Attorney, Agent, or Firm* — Oblon, McClelland, Maier & Neustadt, L.L.P.

(57) ABSTRACT

A system for managing correspondence between a cache memory, subdivided into a plurality of cache areas, and a main memory, subdivided into a plurality of memory areas, includes: a mechanism allocating, to each area of the main memory, at least one area of the cache memory; a mechanism temporarily assigning, to any data row stored in one of the areas of the main memory, a cache row included only in one cache area allocated to the main memory area wherein the data row is stored; and a mechanism generating and updating settings of the allocation by activating the allocation mechanism, the temporary assigning mechanism configured to determine a cache row to be assigned to a data row based on the allocation settings.

13 Claims, 8 Drawing Sheets

(56) References Cited

Figure 1:
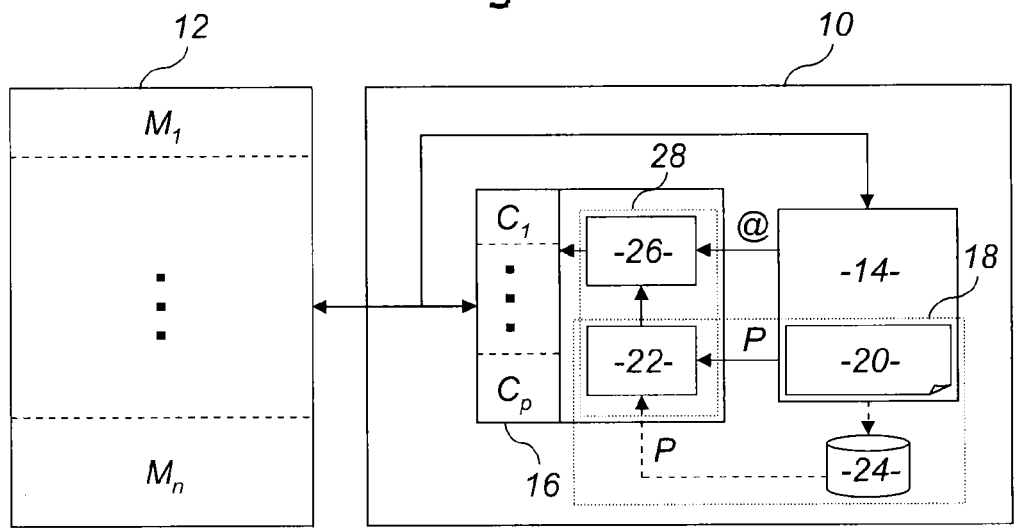

U.S. PATENT DOCUMENTS 7,581,066 B2 * 8/2009 Marwinski .............. G06F 9/52
707/999.008
2010/0275049 A1 10/2010 Balakrishnan et al.

OTHER PUBLICATIONS

Changkyu Kim, et al., "Nonuniform cache architectures for wire-delay dominated on-chip caches", IEEE Micro, vol. 23, No. 6, Nov.-Dec. 2003, pp. 99-107.
Jaehyuk Huh, et al., "A NUCA substrate for flexible CMP cache sharing", IEEE Transactions on Parallel and Distributed Systems, vol. 18, No. 8, Aug. 2007, pp. 1028-1040 (submitting re-publication).
Evgeny Bolotin, et al., "The power of priority: NoC based distributed cache coherency", Proceedings of First International Symposium on Networks-on-Chips, May 2007, 10 Pages.
Haakon Dybdahl, et al., "An adaptive shared/private NUCA cache partitioning scheme for chip multiprocessor", Proceedings of the IEEE 13 International Symposium on High Performance Computer Architecture, Feb. 2007, pp. 2-12.
Hideaki Saito, et al., "A chip-stacked memory for on-chip SRAM-rich SoCs and processors", IEEE Journal of Solid-State Circuits, vol. 45, No. 1, Jan. 2010, pp. 15-22.
Bo Zhao, et al., "Variation-tolerant non-uniform 3D cache management in die stacked multicore processor", Proceedings of the 42$^{nd}$ Annual IEEE/ACM International Symposium on Microarchitecture, Dec. 2009, pp. 222-231.
Niti Madan, et al., "Optimizing communication and capacity in a 3D stacked reconfigurable cache hierarchy", Proceedings of IEEE 15$^{th}$ International Symposium on High Performance Computer Architecture, Feb. 2009, pp. 262-273.
Feihui Li, et al., "Design and management of 3D chip multiprocessors using network-in-memory", Proceedings of the 33$^{rd}$ Annual International Symposium on Computer Architecture, May-Jun. 2006, 12 Pages.

* cited by examiner

SYSTEM AND METHOD FOR MANAGING CORRESPONDENCE BETWEEN A CACHE MEMORY AND A MAIN MEMORY

The present invention relates to a system for managing correspondence between a cache memory and a main memory. It also relates to a corresponding method and computer program.

A cache memory is intended to store, temporarily and as close as possible to the computing means of an information system, for example one or a plurality of microprocessors, data also stored in a main memory and used in read or write mode by the computing means. When inserted between the computing means and the main memory intended to be used in data read or write mode by these computing means, and presented in the form of a smaller memory but with quicker access than the main memory, the cache memory makes it possible to speed up data processing. The operating principle of the cache memory is as follows: all data read or write operations in the main memory performed by the computing means are first routed to the cache memory; if the data is in cache memory (cache memory hit), it is returned directly to the computing means (in read mode) or updated in the cache memory (in write mode); if, on the other hand, it is not in the cache memory (cache memory miss), it is transferred from the main memory to the cache memory before being supplied to the computing means (in read mode) or stored in the cache memory before being transferred to the main memory (in write mode).

In practice, a plurality of cache memory levels may be envisaged between the computing means and the main memory. In practice also, a cache memory may be topologically organized in a complex manner into a plurality of memory banks accessible via at least one connection port, each memory bank being suitable for being considered as a basic cache memory: in this case, the architecture has a non-uniform access time to the data stored in the cache memory, this access time being dependent on the location of the memory bank wherein a data item is temporarily stored and the connection port using which the cache memory is accessed.

Furthermore, a data row, defined as consisting of a predetermined number of successive data words stored in the cache or main memory (i.e. a data row consists of adjacent data items), is the smallest amount of data suitable for being exchanged between the cache memory and the main memory, given that a data word is the smallest amount of data to be accessible in read or write mode by the computing means. In this way, the cache memory makes use not only of the temporal locality principle in respect of the data, whereby data recently used by the computing means is highly likely to be reused shortly and thus needs to be temporarily stored in the cache memory, but also the spatial locality principle in respect of the data, whereby data adjacent to data recently used by the computing means is highly likely to be used shortly and thus needs to be temporarily stored in the cache memory with the recently used data with which it is adjacent.

A correspondence needs to be established between the cache memory and the main memory to determine how to temporarily assign a data row from the cache memory, or cache row, to any data row stored in the main memory given that the main memory comprises a markedly higher number of data rows than the number of cache rows. Known systems for managing correspondence between the cache memory and the main memory generally implement one of the three following principles:
  fully associative correspondence,
  predefined correspondence,
  associative correspondence with N-channel sets.

The first fully associative correspondence principle consists of assigning in principle any cache row to any of the data rows of the main memory. No prior allocation of cache areas to areas of the main memory is defined. The choice of assigning a cache row to a data row is thus free and made in practice based on cache data availability or longevity criteria, which is optimal for the cache memory hit rate but is subject to some complexity.

The second predefined correspondence principle consists of applying a modulo function to the address of each data row of the main memory, such that the same cache row is allocated in principle to a plurality of data rows, successively separated by a constant distance (i.e. the modulo) in the main memory. In this way, the prior allocation of cache areas to areas of the main memory is completely deterministic and the assignment of a cache row to a data row is set by the modulo function. This is optimal in terms of simplicity but it subject to a generally unsatisfactory cache memory hit rate.

Finally, the third associative correspondence principle with N-channel sets, intermediate between the first two, consists of pre-allocating a set to each data row of the main memory according to the address thereof, each set being distributed in the cache memory in N predefined channels, and then assigning any cache row to any of the data rows of the main memory in the set allocated thereto, i.e. in concrete terms one set per channel. In this way, prior allocation of cache areas to areas of the main memory is defined but assigning a cache row to a data row nonetheless retains a certain degree of freedom in the set allocated thereto. The final choice of assigning a cache row to a data row is thus made in practice based on cache data availability or longevity criteria, similar to those applied in the first principle but simplified.

In most systems for managing correspondence between cache memory and main memory, only one of these three principles is applied. In general, the third principle is preferred.

When the second or third principle is applied, it may be considered that the system for managing correspondence provides the correspondence between a cache memory, implicitly subdivided into a plurality of cache areas, and a main memory, implicitly subdivided into a plurality of memory areas, and comprises:
  implicit means for allocating, to each area of the main memory, at least one area of the cache memory, and
  means for temporarily assigning, to any data row stored in one of said areas of the main memory, a cache row included only in one cache area allocated to the main memory area wherein said data row is stored.

The correspondence between the cache memory and the main memory is in any case implicit and defined in principle by means of the selected correspondence principle. Furthermore, it is only based on the expression of the address of the data rows in the main memory, independently of any consideration in respect of the application(s), or in respect of the microprocessor(s), using the main memory.

Moreover, when the cache memory consists of a plurality of memory banks, each memory bank applies one of the above-mentioned principles, generally the third. However, the prior choice of a bank for the temporary storage of a data row may be guided merely by a uniform distribution of the data between the banks available for the main memory. Here again, the correspondence is defined independently of any consideration in respect of the application(s), or in respect of the microprocessor(s), using the main memory.

Known systems for managing correspondence thus do not appear to be sufficiently flexible to adapt to various main memory use scenarios, particularly when a plurality of applications or a plurality of microprocessors are in competition. However, the development of electronic systems, particularly systems on a chip, which are two-dimensional or three-dimensional, is tending toward greater complexity in respect of memory access, by one or a plurality of microprocessors, for one or a plurality of applications. It would be a good idea if systems for managing correspondence could also incorporate this.

Furthermore, cache memory structures have seen considerable development in recent years: uniform or non-uniform access, two-dimensional or three-dimensional architectures, static or dynamic data distribution, multiple banks, adaptivity, etc. Numerous publications bear witness to this development, including:

- the article by C. Kim, D. Burger et S. W. Keckler, entitled "Nonuniform cache architecture for wire-delay dominated on-chip caches", IEEE Micro, volume 23, No. 6, pages 99-107, November-December 2003,
- the article by J. Huh, C. Kim, H. Shafi, L. Zhang, D. Burger and S. W. Keckler, entitled "A NUCA substrate for flexible CMP cache sharing", Proceedings of the 19th International Conference on Supercomputing, pages 31-40, June 2005, Boston Mass.,
- the article by E. Bolotin, Z. Guz, I. Cidon, R. Ginosar and A. Kolodny, entitled "The power of priority: NoC based distributed cache coherency", Proceedings of First International Symposium on Networks-on-Chips, pages 117-126, May 2007, Princeton, N.J.,
- the article by H. Dybdahl and P. Stenstrom, "An adaptive shared/private NUCA cache partitioning scheme for chip multiprocessors", Proceedings of the IEEE 13th International Symposium on High Performance Computer Architecture, pages 2-12, February 2007, Scottsdale, Ariz.,
- the article by H. Saito, M. Nakajima, T. Okamoto, Y. Yamada, A. Ohuchi, N. Iguchi T. Sakamoto, K. Yamaguchi and M. Mizuno, entitled "A chip-stacked memory for on-chip SRAM-rich SoCs and processors" IEEE Journal of Solid-State Circuits, volume 45, No. 1, pages 15-22, January 2010,
- the article by B. Zhao, Y. Du, Y. Zhang et J. Yang, entitled "Variation-tolerant non-uniform 3D cache management in die stacked multicore processor", Proceedings of the 42nd annual IEEE/ACM International Symposium on Microarchitecture, pages 222-231, December 2009, New York, N.Y.,
- the article by N. Madan, L. Zhao, N. Muralimanohar, A. Udipi, R.

Balasubramonian, R. Iyer, S. Makineni and D. Newell, entitled "Optimizing communication and capacity in a 3D stacked reconfigurable cache hierarchy", Proceedings of IEEE 15th International Symposium on High Performance Computer Architecture, pages 262-274, February 2009, Raleigh, N.C.,

- the article by L. Feihui, C. Nicopoulos, T. Richardson, Y. Xie, V. Narayanan and M. Kandemir, entitled "Design and management of 3D chip multiprocessors using network-in-memory", Proceedings of 33rd annual International Symposium on Computer Architecture, pages 130-141, May-June 2006, Boston, Mass.

In this respect, note should be taken in particular of the progress proposed in the patent applications published under the numbers US 2010/0275049 A1 and WO 2006/078837 A2. The patent application US 2010/0275049 A1 discloses the principle of adapting the size of a cache memory with multiple banks, by possible dynamic deactivation of a portion of the memory banks thereof. The aim to be achieved in this document is that of dynamically adapting the size of the cache memory to the requirements of the main memory according to the applications or microprocessors using same. The main memory and the cache memory are considered therein, in terms of dynamic adaptation, as two overall entities. The patent application WO 2006/078837 A2 discloses a similar principle, wherein some memory banks of a cache memory with multiple banks can be deactivated as cache in order to be operational as rapid local memory, according to the requirements of a microprocessor connected to this cache memory. In this document also, the main memory and the cache memory are considered, in terms of dynamic adaptation, as two overall entities.

The dynamic adaptation of the cache memory as described in these two documents is thus no longer sufficiently flexible to react effectively to competition scenarios between a plurality of applications or a plurality of microprocessors.

It may thus be sought to provide a system for managing correspondence between cache memory and main memory suitable for doing away with at least some of the problems and constraints mentioned above.

The invention thus relates to a system for managing correspondence between a cache memory, subdivided into a plurality of cache areas, and a main memory, subdivided into a plurality of memory areas, comprising:

- means for allocating, to each area of the main memory, at least one area of the cache memory,
- means for temporarily assigning, to any data row stored in one of said areas of the main memory, a cache row included only in one cache area allocated to the main memory area wherein said data row is stored, further comprising means for generating and updating settings of this allocation by activating the allocation means, the temporary assigning means being designed to determine a cache row to be assigned to a data row based on these allocation settings.

In this way, by means of the invention, the specific allocation of cache areas to various areas of the main memory is expressed explicitly using settings and may be updated by changing these settings. It thus becomes configurable. Besides a principle of fully associative, predefined correspondence or associative correspondence with N-channel sets, optionally applied between the main memory and the cache memory, great flexibility is then given to the use of the cache memory by different applications or different processors the uses whereof may be located in different areas of the main memory. Such a configurable allocation may replace one of the three correspondence principles mentioned above or complete same advantageously.

The invention also relates to an electronic chip comprising a cache memory and a system for managing correspondence as defined above.

Optionally, the temporary assigning means are implemented in the cache memory and comprise at least one allocation detector receiving as an input the allocation settings and supplying as an output an indication of correspondences between the main memory areas and the cache areas.

Also optionally, the temporary assigning means further comprise at least one distribution module receiving as an input the address of a data row stored in the main memory and supplying as an output the selection of a cache row based on the correspondence indication supplied by the allocation detector.

Also optionally, the distribution module is microprogrammed for the use of a hash function, particularly a modulo function, an XOR-based hash function or a combination of these functions.

Also optionally, the temporary assigning means comprise:
a plurality of allocation detectors accessible in parallel,
a plurality of distribution modules for simultaneously receiving a plurality of addresses of data rows stored in the main memory, and
interfaces for routing input and/or output data of these pluralities of allocation detectors and distribution modules.

Also optionally, the cache memory is a memory with multiple memory banks organized according to a two-dimensional or three-dimensional topology, each cache area being a memory bank of the cache memory suitable for comprising a specific control logic.

Also optionally, the memory banks of the cache memory are interconnected together by a two-dimensional or three-dimensional network-on-chip structure, the electronic chip comprising a plurality of access ports to this network-on-chip structure, one access port being defined respectively for each of said areas of the main memory.

The invention also relates to a method for managing correspondence between a cache memory, subdivided into a plurality of cache areas, and a main memory, subdivided into a plurality of memory areas, comprising the following steps:
allocating, to each area of the main memory, at least one area of the cache memory,
temporarily assigning, to any data row stored in one of said areas of the main memory, a cache row included only in one cache area allocated to the main memory area wherein said data row is stored,
further comprising steps for generating and updating settings in respect of this allocation, the temporary assigning of a cache row to a data row being performed based on these allocation settings.

Optionally, each area of the main memory is identified by values of a predetermined set of address bits, for example the most significant bits, from the address bits using which the addresses of the data stored in the main memory are expressed.

Also optionally, the allocation to two different areas of the main memory of at least one common area of the cache memory is authorized and configurable using the allocation settings.

Finally, the invention also relates to a computer program downloadable from a communication network and/or saved on a computer-readable medium and/or executable by a processor, comprising instructions for executing the steps of a method for managing correspondence as defined above, when said program is executed on a computer.

Figure 2:
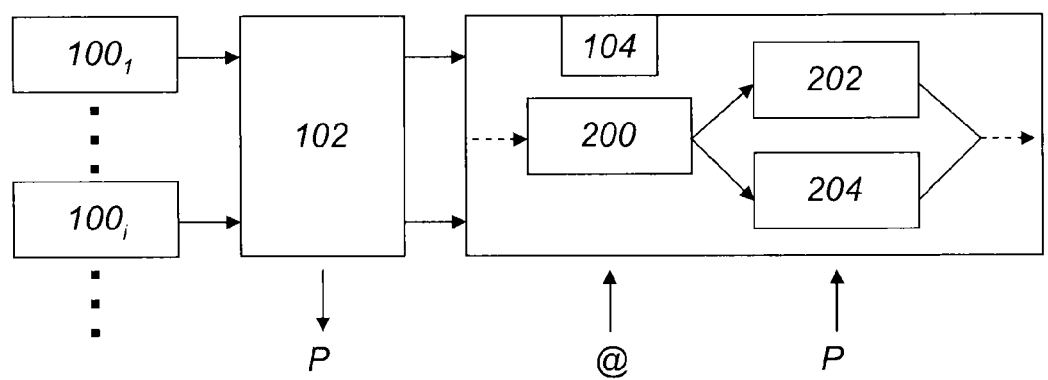
Figure 3:
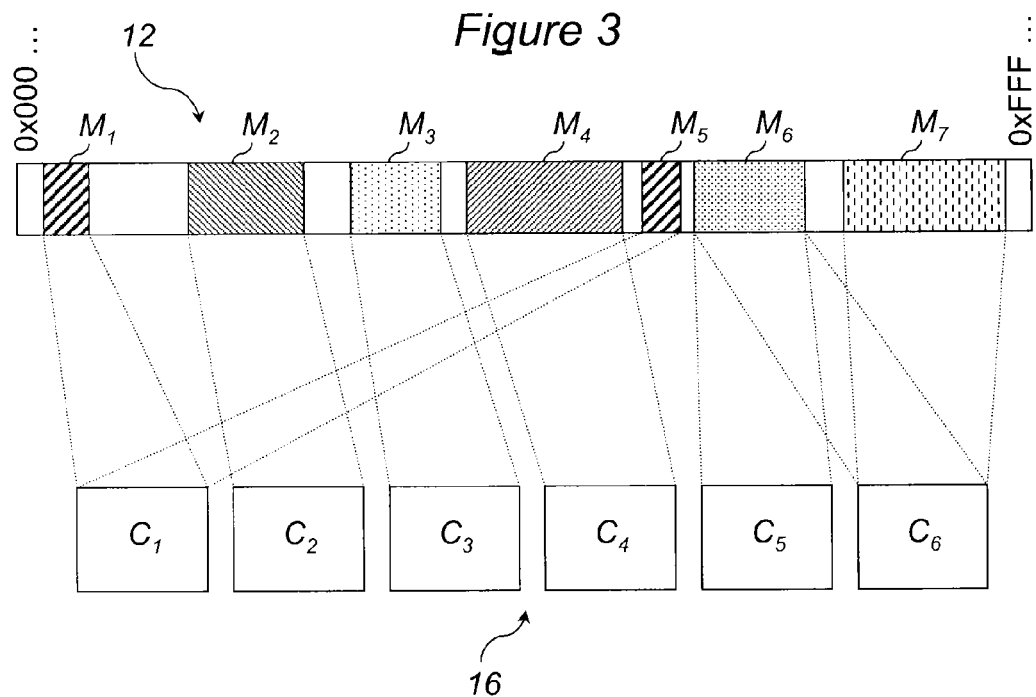
Figure 5:
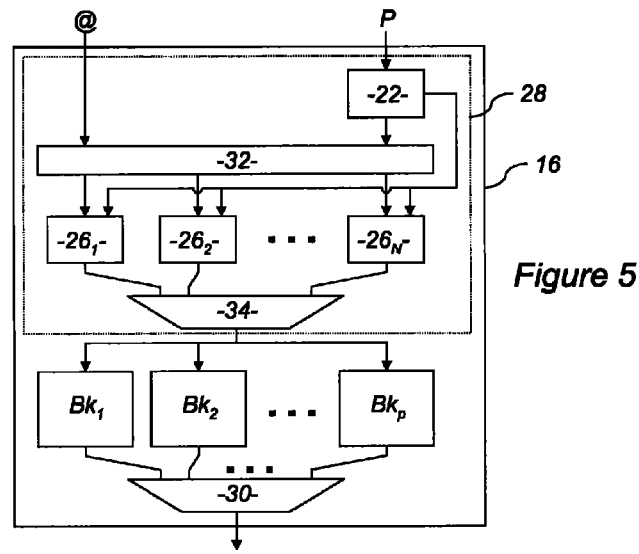
Figure 6:
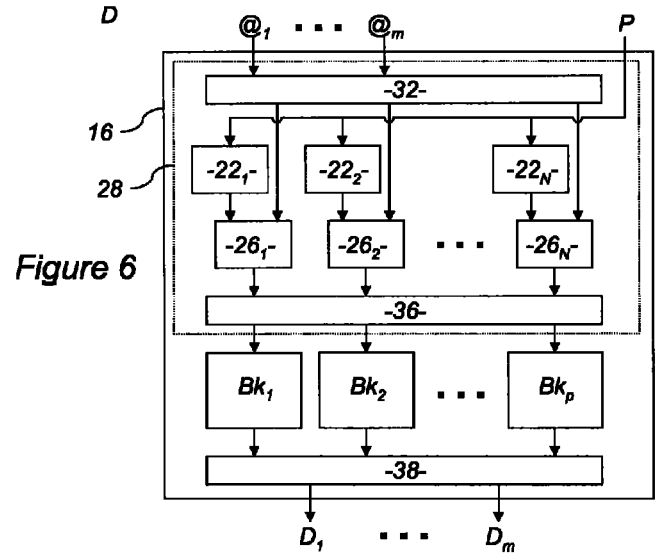
Figure 7:
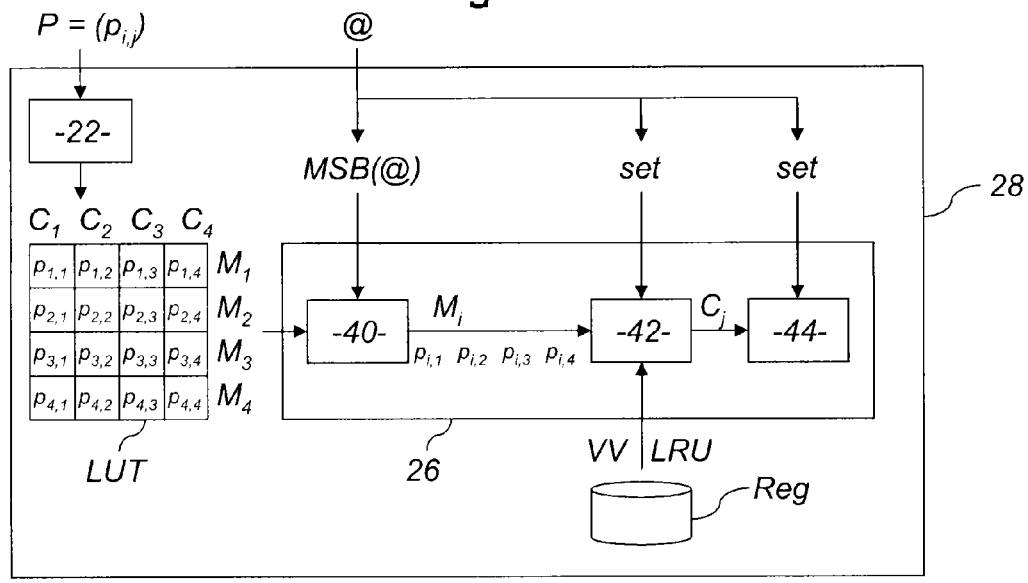
Figure 8:
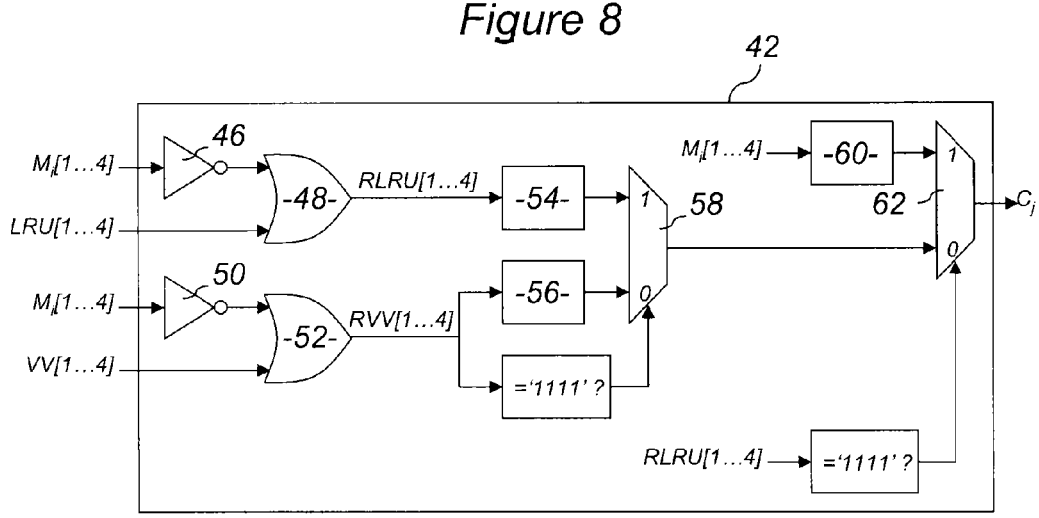
Figure 9:
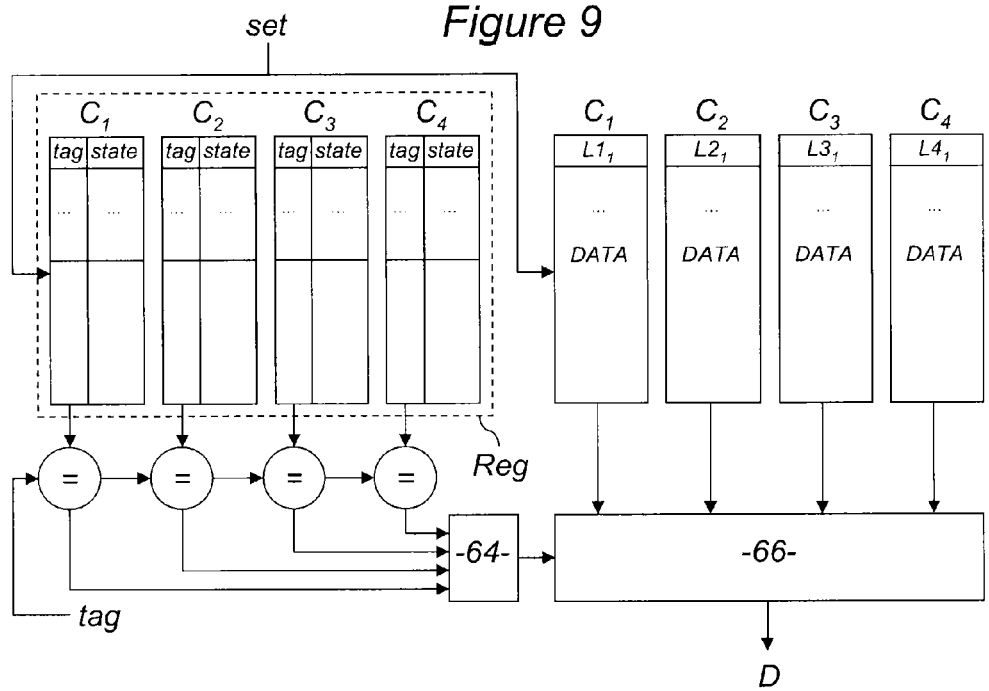
Figure 10:
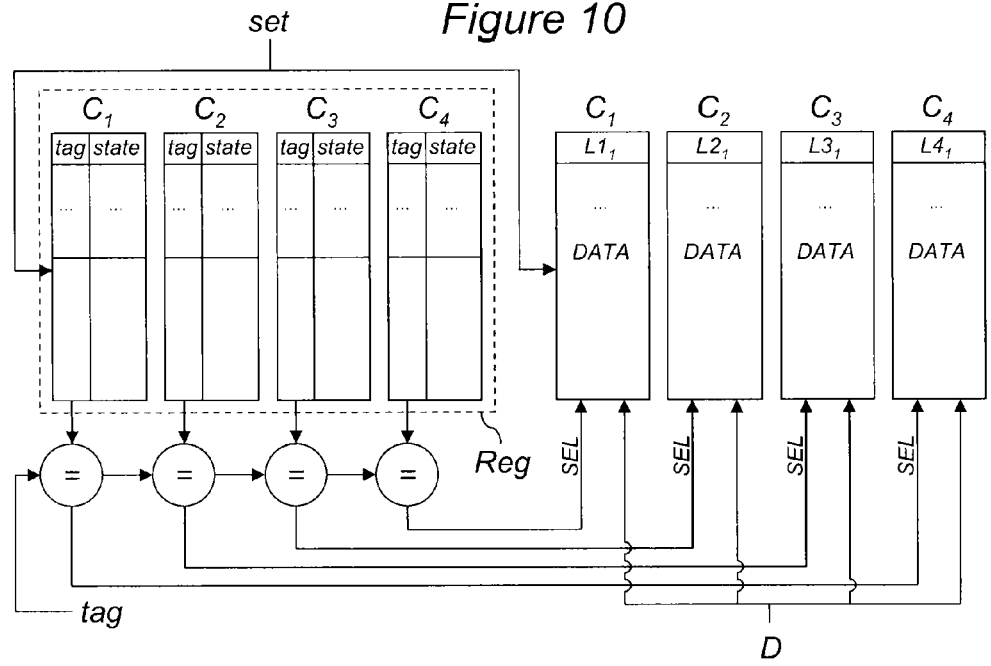
Figure 11:
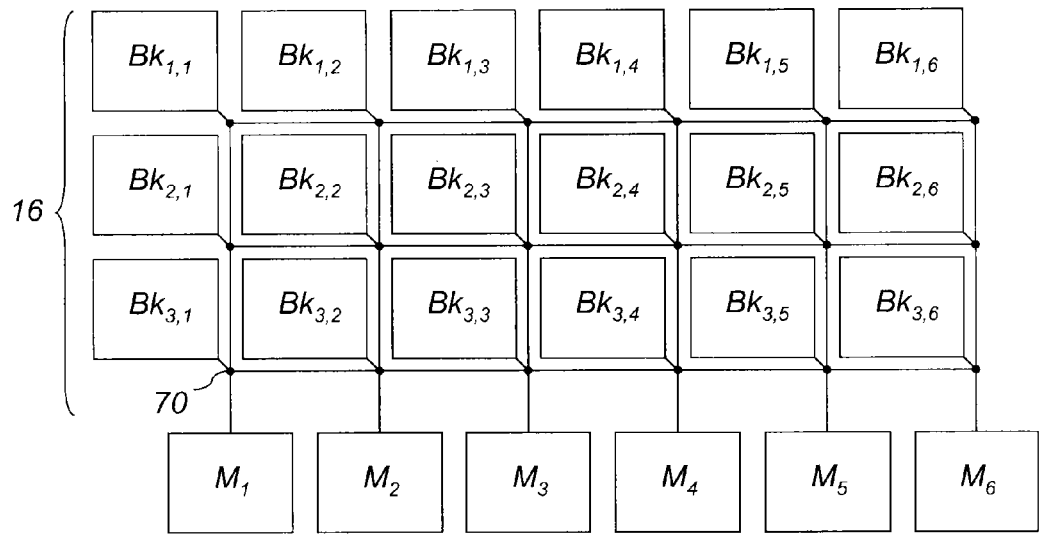
Figure 12:
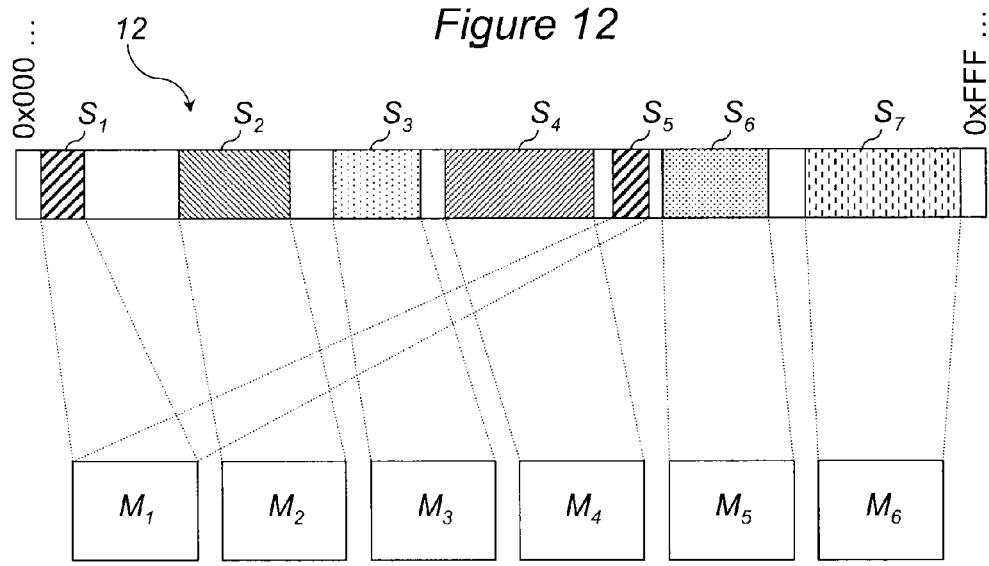
Figure 13:
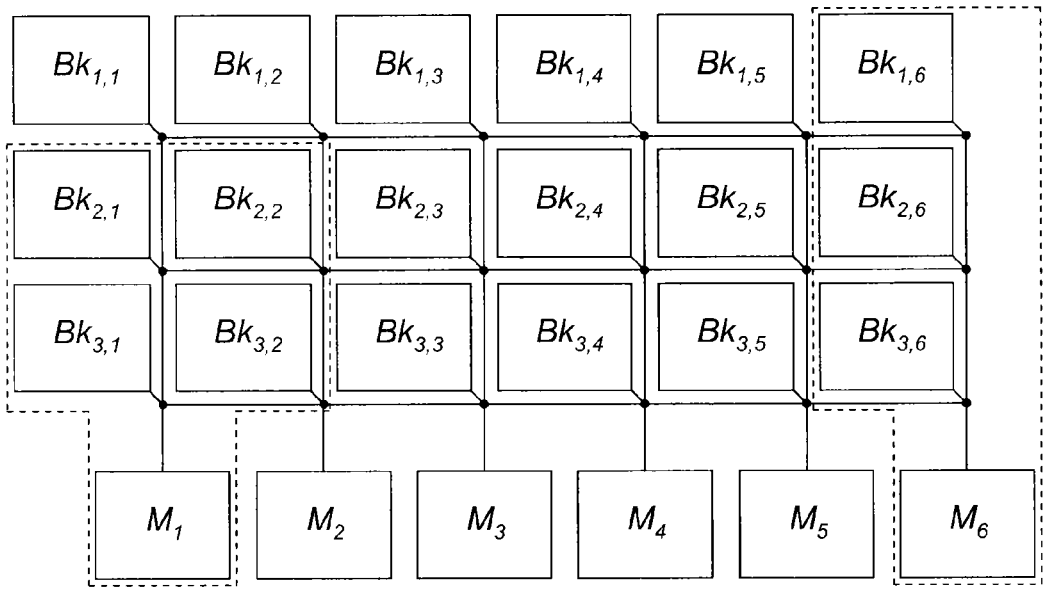
Figure 14:
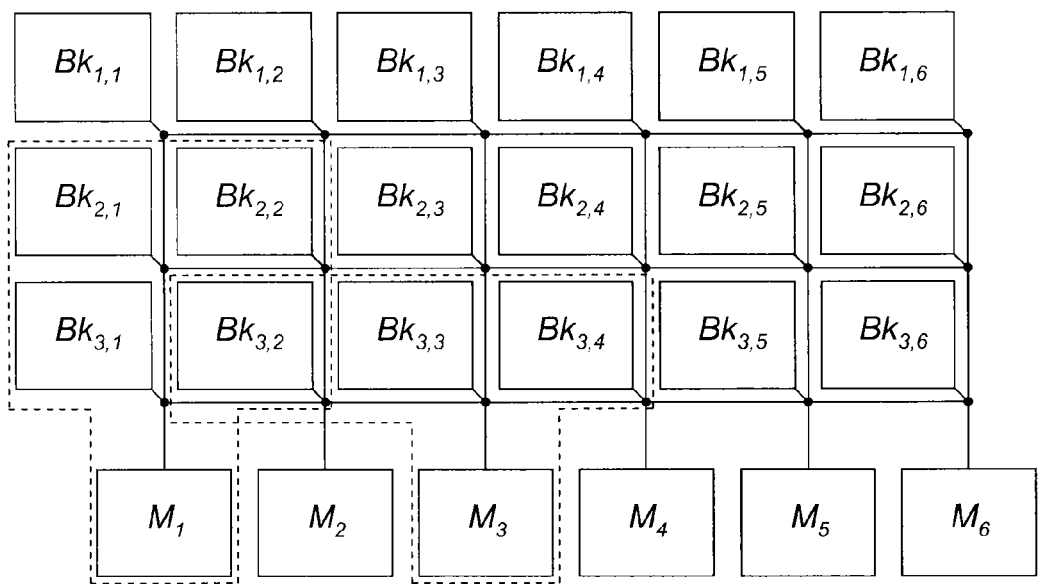
Figure 15:
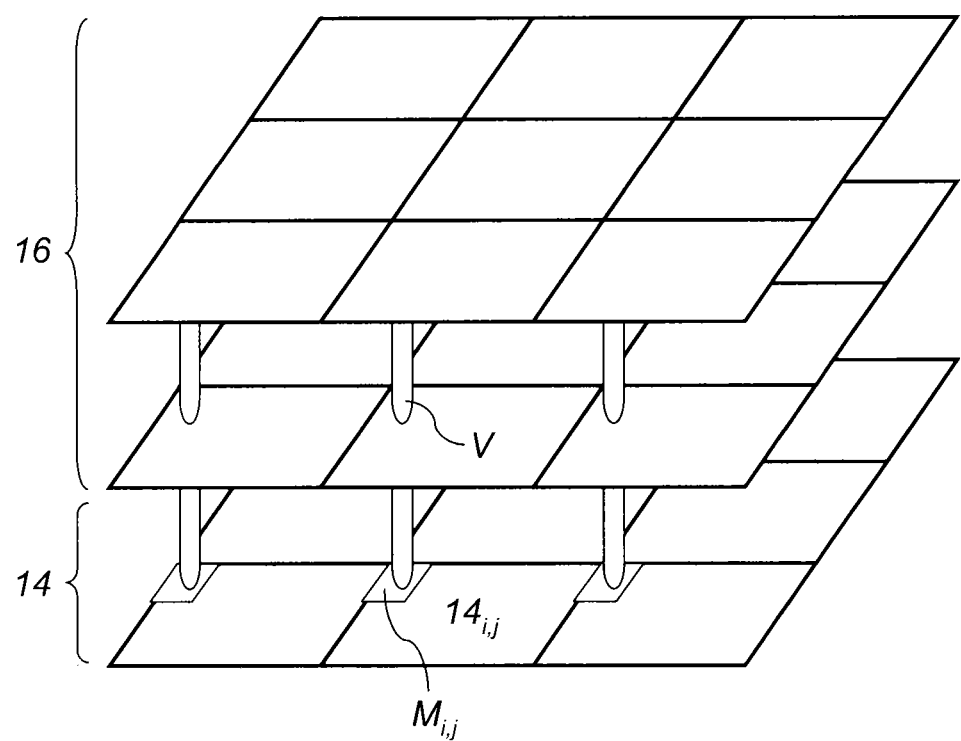

The invention will be understood more clearly using the following description, given merely as an example, with reference to the appended figures wherein:

FIG. 1 schematically represents the general structure of an electronic chip comprising a cache memory and a system for managing correspondence, according to one embodiment of the invention, FIG. 2 illustrates the successive steps of a method for managing correspondence used by the electronic chip in FIG. 1, FIG. 3 is an example of correspondence established by the system for managing correspondence of the electronic chip in FIG. 1, following an implementation of the method in FIG. 2, FIGS. 4, 5 and 6 schematically represent the general structure of a cache memory with cache banks according to three separate embodiments of the invention, FIG. 7 schematically represents the general structure of temporary assigning means of a cache memory according to one embodiment of the invention, FIG. 8 schematically represents the architecture of a channel selector of the temporary assigning means in FIG. 7, FIGS. 9 and 10 schematically represent possible read and write architectures of the cache memory for which the temporary assigning means are illustrated in FIG. 7, FIGS. 11, 13 and 14 partially and schematically represent the general structure of a cache memory with cache banks and multiple non-uniform access according to one embodiment of the invention, FIG. 12 illustrates the possible allocation of connection ports of the cache memory in FIGS. 11, 13 and 14 to main memory areas, and FIG. 15 partially and schematically represents the general structure of a three-dimensional cache memory according to one embodiment of the invention.

The digital processing device represented schematically in FIG. 1 comprises an electronic chip 10 connected to a large-capacity external memory used as the main memory 12, the electronic chip 10 comprising a microprocessor 14 associated with a cache memory 16. In the basic example in FIG. 1, the cache memory 16 may be a level one uniform two-dimensional cache, but the invention applies more generally to any type of cache memory of any level, including higher level two-dimensional or three-dimensional cache memories with a non-uniform architecture and static or dynamic distribution. The microprocessor 14 is a common multi-task processor, capable of executing one or a plurality of applications concurrently or not.

According to various possible uses of the digital processing device, the main memory 12 may be considered to be subdivided into a plurality of memory areas $M_1, \ldots, M_n$. Each memory area is for example a memory segment of adjacent addresses and is identified by values of a predetermined set of address bits, for example the most significant bits, from the address bits using which the addresses of the data stored in the main memory 12 are expressed. Alternatively or additionally, each identified memory area corresponds to a memory space to be occupied and used specifically when executing a corresponding application (i.e. that of a computer program). The memory areas $M_1, \ldots, M_n$ are not necessarily the same size.

The cache memory 16 may also be considered to be subdivided into a plurality of cache areas $C_1, \ldots, C_p$. Each cache area is for example a memory segment of adjacent addresses. In the case of a level one uniform two-dimensional cache, each cache area is a predetermined portion of the uniform cache memory. In the case of a cache with a non-uniform architecture, particularly a cache memory with multiple memory banks organized according to a two-dimensional or three-dimensional topology, each cache area is for example one or a plurality of these memory banks. The cache areas $C_1, \ldots, C_p$ are not necessarily the same size.

The electronic chip 10 further comprises a system 18 for managing correspondence between the cache memory 16 and the main memory 12, more specifically between the cache areas $C_1, \ldots, C_p$ of the cache memory 16 and the memory areas $M_1, \ldots, M_n$ of the main memory 12. This system 18 for managing correspondence is for example distributed between the microprocessor 14 and the cache memory 16. It is designed to generate and update settings for allocating, to each area of the main memory 12, at least one area of the cache memory 16.

The system 18 for managing correspondence thus comprises means 20 for allocating, to each area of the main memory 12, at least one area of the cache memory 16. These allocating means 20 are for example computerized, implemented in the form of a computer program, and activated on the execution of this computer program by the microprocessor 14. They are schematically represented in the figure in the form of a file 20 in the microprocessor 14, but the computer program is in fact a file available for example on an external hard drive and loaded into the main memory 12 or in the local memory (not shown) by the microprocessor 14 for the execution thereof. The allocation means 20 may consist of a specific predetermined program, optionally configurable for setting the correspondence of the areas of the main memory 12 with the areas of the cache memory 16, supplying allocation settings P as an output. It may also consist of a portion of program, particularly a sequence of instructions in a more comprehensive application, defining using settings the particular requirements of this application in terms of cache memory space. The microprocessor 14 activating the allocation means 20 then acts as means for generating and updating the allocation settings P.

The system 18 for managing correspondence further comprises at least one allocation detector 22 implemented in the cache memory 16. This allocation detector 22 receives as an input the allocation settings P and supplies as an output an indication of correspondence between the main memory areas $M_1, \ldots, M_n$ and the cache areas $C_1, \ldots, C_p$. It may be implemented merely in the form of a deterministic configurable function stored in cache memory 16. The allocation parameters P are supplied to the allocation detector 22, either directly by the allocation means 20, or indirectly after having been stored thereby in a local memory 24 of the electronic chip 10.

Moreover, the allocation detector 22 forms, with at least one distribution module 26 implemented in the cache memory 16, means 28 for temporarily assigning, to any data row stored in one of the main memory areas $M_1, \ldots, M_n$, a cache row included only in a cache area allocated to the main memory area wherein the data row in question is stored. More specifically, the distribution module 26 receives as an input the address @ of a data row stored in the main memory 12 and supplies as an output the selection of a cache row based on the correspondence indication supplied by the allocation detector 22. It may also be implemented merely in the form of a deterministic configurable function stored in cache memory 16.

This function is for example a hash function, particularly a modulo function, an XOR-based hash function, etc., or a combination of these functions. Indeed, hash functions meet the specific constraints of data distribution in cache memory: low-cost data processing in material and time terms, uniformity of results in the output set (preference should not be given to one cache row over the other, on the contrary). The hash function selected should further preferably eliminate some access regularity, such as regular access to the main memory with a constant pitch. This access should indeed if possible become irregular in the cache memory following the application of the hash function. It is for example well known that when the constant pitch is a power of two, this would pose conflict problems in the cache memory if this constant pitch were retained. Finally, the selected hash function should preferably separate in the cache memory two consecutive data rows in the main memory. This makes it possible to use the various cache areas more uniformly over time, which offers an advantage when the cache memory consists of a plurality of cache banks.

An example of a hash function suitable for carrying out this distribution is thus a modulo function wherein the value of the modulo is a prime number, greater than the number of sets in the case of associative correspondence with N-channel sets.

The possible drawback of such a solution is the material cost thereof, a division being complex to perform when the divider is not a power of two.

A further example of a hash function suitable for performing this distribution is an XOR-based function. Numerous XOR-based hash functions are known. Based on the properties of the two-component Galois field and the extensions thereof, they are suitable for performing effective mixing at least cost. To obtain the selected cache row, a portion of the address @ is multiplied by a matrix representing the hash function. The properties of the matrix may be determined when dealing with known algebraic forms (permutations, polynomial functions, irreducible polynomial functions). It is thus possible to explicitly break some access modes. Furthermore, possible refining of the XOR-based functions consists of multiplying the result, using the AND function which is the multiplication in the two-component Galois field, with a portion of the original address @. This mode is generally called XORM in the prior art.

An example of a matrix M for an XOR-based hash function, for sixteen output sets (coded on four bits) and eight bits retrieved from the address @, is for example:

$$M = \begin{pmatrix} 1 & 0 & 0 & 1 \\ 0 & 1 & 1 & 0 \\ 0 & 1 & 0 & 0 \\ 1 & 0 & 0 & 0 \\ 1 & 0 & 0 & 0 \\ 0 & 1 & 0 & 0 \\ 0 & 0 & 1 & 0 \\ 0 & 0 & 0 & 1 \end{pmatrix}.$$

Alternatively, it is also possible to do away with a specific distribution function, for a basic distribution based on a deterministic correspondence principle, for example based on some of the most significant bits of the address @. Similarly, if it is known that cache memory access is to be carried out in a known preferred manner, it is advisable not to account for some bits of the address @, in this instance the two least significant bits in the previous example: this prevents conflicts by optimizing the use of the cache memory.

In sum, regardless of the distribution principle selected, the means 28 for temporarily assigning a cache row to an any data row receive as an input the address @ of a data row stored in the main memory 12 along with the allocation settings P and supply as an output the selection of a cache row in one of the cache areas $C_1, \ldots, C_p$ allocated to the main memory areas wherein the data row having the address @ is stored.

It is understood that, as they are configured, the allocation means 20 are suitable for dynamically defining the correspondence between the main memory 12 and the cache memory 16 using the generation and possible update of the allocation settings P. In this way, according to the task(s) to be executed by the microprocessor 14, concurrently or not, it becomes possible to adapt for each individual case this correspondence so as to optimize the use of the cache memory 16 to, eventually, limit the number of accesses to the main memory 12 and the number of cache memory misses. For example, when a single task is executed by the microprocessor 14 and this task does not use the main memory 12 uniformly, a non-uniform correspondence updated by the allocation means 20 optimizes the use of the cache memory 16 to increase the amount of cache memory allocated to a main memory area subject to extensive use to the detriment of a main memory area subject to little use. For example also, when a plurality of tasks are executed concurrently not using the main memory 12 uniformly, here again, a non-uniform correspondence updated by the allocation means 20 optimizes the use of the cache memory 16 by each of the tasks. A system for managing correspondence according to the invention thus makes it possible to adapt the topology of the cache memory 16 according to the requirements of the software task(s) executed by the microprocessor 14.

The operation of the system for managing correspondence 18 will now be detailed with reference to FIG. 2.

During concurrent steps $100_1, \ldots, 100_i, \ldots$, optionally executed in parallel and corresponding to concurrent tasks, the microprocessor 14 activates the allocation means 20 on the basis of requirements expressed in cache memory space in instruction rows of these concurrent tasks or on the basis of one or a plurality of specific programs for setting the correspondence of the areas of the main memory 12 with the areas of the cache memory 16. Then during a step 102 for generating or updating the allocation settings P, activating the allocation means 20 produces new values of these allocation settings P. These new values are stored in the local memory 24 or sent directly to the allocation detector 22 of the cache memory 16.

Following the step 102, during a general step 104 for executing one or a plurality of the above-mentioned concurrent tasks, whenever access to a data word is sought by the microprocessor 14 in read or write mode (step 200), the address @ of this data word is supplied to the cache memory 16. The cache memory 16 comprises, conventionally, a registry wherein the data rows of the main memory 12 temporarily stored in the cache memory 16 are listed. If the data word in question is part of these data rows, it is found at a step 202. Otherwise, the process goes to a step 204 for temporarily assigning, to the data row comprising this data word in the main memory 12, a cache row included only in one cache area allocated to the main memory area wherein said data row is stored. For this, the address @ of the data word in question is supplied to the distribution module 26 of the cache memory 16 and the allocation settings P are supplied to the allocation detector 22. Temporary assigning of a cache row is then performed based on the address @ and the settings P.

The sequence of the steps 200 and 202 or 204 is repeated for as many times as access is sought to a data word by the microprocessor 14.

As illustrated in FIG. 3 using memory areas represented in the main memory 12 and in the cache memory 16, the system for managing correspondence 18 of the electronic chip 10 is suitable for:

allocating the same cache area $C_1$ to a plurality of main memory areas $M_1$, $M_5$, in a configurable manner using the settings P, conversely, allocating a plurality of cache areas $C_5$, $C_6$ to the same main memory area $M_6$, in a configurable manner using the settings P, more generally, allocating in a reconfigurable manner using the settings P a variable number of cache areas, of optionally variable sizes, to a variable number of main memory areas, also of optionally variable sizes.

Figure 4:
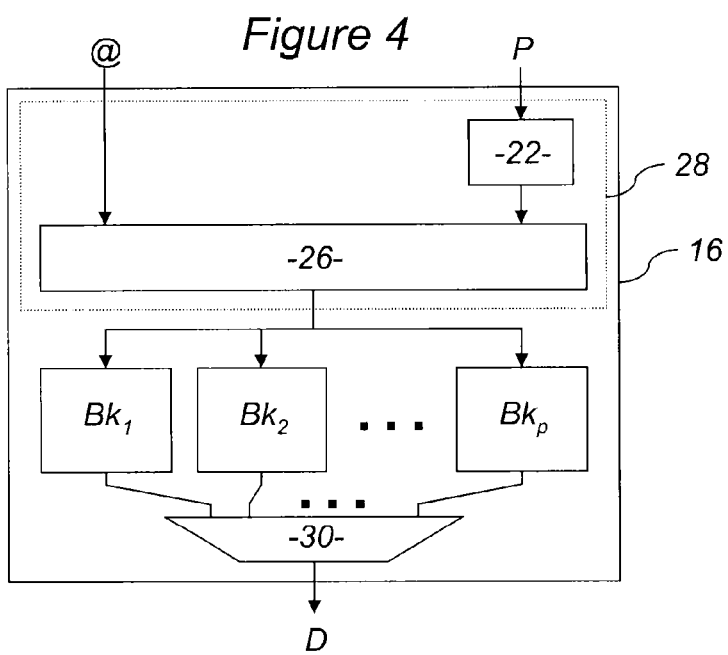

FIG. 4 schematically represents a cache memory, with an optionally uniform architecture, having a plurality of memory banks according to a first embodiment of the invention. In this embodiment and as mentioned above, each memory bank $Bk_1, \ldots, Bk_p$ of the cache memory 16 is a cache area. Furthermore, optionally, each memory bank $Bk_1, \ldots, Bk_p$ of the cache memory 16 may form a cache in its own right, integrating a specific control logic suitable for managing the cache memory 16 access hits and misses in a decentralized fashion. The memory banks $Bk_1, \ldots, Bk_p$ are connected to a single output via a multiplexer 30. Moreover, as in the functional diagram in FIG. 1, the temporary assigning means 28 of the cache memory 16 receive as an input the address @ of a data row stored in the main memory 12 and the allocation settings P. At the output of the multiplexer 30, the cache memory 16 may supply a data word D requested or updated by the microprocessor 14.

FIG. 5 schematically represents a cache memory, with an optionally uniform architecture, having a plurality of memory banks according to a second embodiment of the invention.

According to this second embodiment, the single distribution module 26 of the temporary assigning means 28 of the cache memory 16 is replaced by a plurality of different distribution modules $26_1, \ldots, 26_N$, each being applicable to one or a plurality of main memory areas $M_1, \ldots, M_n$ and not to the main memory 12 overall. The temporary assigning means 28 of the cache memory 16 then further comprise a routing interface 32 which, according to the address @ of a data row stored in the main memory 12 supplied as an input, determines the main memory area $M_1, \ldots, M_n$ wherein it is located and consequently the distribution module 26, to be associated therewith. Routing is performed for example very simply, on the basis of a certain number of most significant bits of the address @. It is also advantageously reconfigurable using settings to be able to dynamically modify the association of any main memory area M, with one of the distribution modules $26_1, \ldots, 26_N$. Finally, according to this second embodiment, the temporary assigning means 28 of the cache memory 16 comprises a multiplexer 34 connected to the various outputs of the distribution modules $26_1, \ldots, 26_N$ to supply a single output.

This second embodiment makes it possible to propose, in a reconfigurable manner, a plurality of access distribution functions to the memory banks $Bk_1, \ldots, Bk_p$ of the cache memory 16, according to the main memory area $M_i$ used. These distribution functions are for example chosen from the hash or other functions detailed above with reference to FIG. 1.

FIG. 6 schematically represents a cache memory, with an optionally uniform architecture, having a plurality of memory banks according to a third embodiment of the invention. This third embodiment is designed on the basis of the previous one to enable a plurality of accesses in parallel to the cache memory 16, so as to increase the throughput thereof.

For this, the single allocation detector 22 of the temporary assigning means 28 of the cache memory 16 is replaced by a plurality of allocation detectors $22_1, \ldots, 22_N$ in principle all identical and accessible in parallel, each being suitable, on receipt of the settings P, for providing the correspondence indications thereof to one of the distribution modules $26_1, \ldots, 26_N$. In this way, on the simultaneous receipt of m addresses $@_1, \ldots, @_m$ of data rows stored in the main memory 12, and provided that these m addresses are associated by the routing interface 32 with distribution modules which are all different (it is thus necessary for m to be less than or equal to N), the temporary assigning means 28 are capable of processing these m prompts simultaneously. It is obviously necessary in this case to replace the multiplexer 34 by a second routing interface 36 suitable for multiplying the number of simultaneous accesses in read/write mode supplied as an output of the temporary assigning means 28. Similarly, the multiplexer 30 should be replaced by a third routing interface 38 suitable for simultaneously supplying m data words $D_1, \ldots, D_m$ in response to m simultaneous prompts.

A concrete example of implementation of the invention will now be detailed in one particularly simple case and with reference to FIGS. 7 to 10: that of a uniform two-dimensional cache memory having any number of cache banks and operating in read and write mode according to associative correspondence principle with N-channel sets. For the purposes of clarity, N will be limited in this example to the value 4.

According to this associative correspondence principle with N-channel sets, one set is allocated to each data row of the main memory in a deterministic and non-configurable manner according to the address thereof, more specifically according to a certain number of predetermined consecutive bits referred to as a "set" of the address @ of each data word in the main memory. In this set, the selection of a row, or in other words a channel, is in principle free subject to a check in respect of the availability and/or longevity of the rows of the set.

However, furthermore, according to one possible implementation of the invention, the main memory is subdivided into n memory areas, for example n=N=4, for example also determined on the basis of a certain number (in this case 2) of most significant bits of the address @ referenced MSB(@), and each channel of the principle of association with N-channel sets of the cache memory is considered, independently of the sets, as a cache area that can be allocated in a configurable and thus reconfigurable manner to one or a plurality of these n main memory areas. The N channels may in one particular case correspond to the same number of memory banks, but this is not a requirement. In this way, to each main memory area $M_i$ one to N channels of the N channels available of the associative correspondence with N-channel sets is allocated. This configurable allocation may be used by means of a look-up table LUT between the main memory areas $M_1, \ldots, M_n$ and the channels, referenced $C_1, \ldots, C_p$ (p=N).

The means 28 for temporarily assigning a cache row to a data row of the main memory, used during the step 204 mentioned above, may then be functionally detailed as illustrated in FIG. 7.

In this particularly simple example, the allocation detector 22 receives the allocation parameters P in the form of a set of binary values $p_{i,j}$ intended to complete the look-up table LUT. This is represented as integrated in the temporary assigning means 28 but may be external thereto and stored elsewhere in the cache memory 16. It is updated by the allocation detector 22 using the allocation settings P. Each setting indicates, by the binary value "1" or "0" thereof, whether the channel $C_j$ is allocated to the main memory area $M_i$ or not.

In this example also, the distribution module 26 receives the address @, in the main memory 12, of a requested data word. From this address @, a module 40 for detecting areas of the distribution module 26 retrieves the bit sequence MSB (@) and selects the corresponding main memory area $M_i$. It supplies to a channel selector 42 of the distribution module 26 the binary values $p_{i,1}, p_{i,2}, p_{i,3}, p_{i,4}$ indicating which channels of the cache memory 16 are allocated to the main memory area $M_i$ selected. These binary values may also be referenced vectorially $M_i[1 \ldots 4]$ as seen with reference to FIG. 8 detailing a possible architecture of the channel selector 42.

The channel selector 42 further receives the set of the address @ along with optionally two status vectors VV (referenced VV[1 . . . 4] in FIG. 8) and LRU (referenced LRU[1 . . . 4] in FIG. 8) corresponding to this set. According to a known principle, the vector VV is a binary coefficient validity vector indicating, for each channel allocated to the address @ according to the set thereof, whether it is free (value "0") or validly occupied by a data row (value "1"). The vector LRU is a use vector, for example having binary coefficients, indicating, for each channel of the set allocated to the address @ according to the set thereof, whether the data row contained therein has recently been used. A generally common technique is that of switching to "1" the coefficient of LRU corresponding to a channel when the data row contained in this channel is used and resetting all the coefficients of the vector LRU to "0" when they are all at "1". In this way, low-cost partial information is obtained on the use of the data rows of the same set. Using the information $p_{i,1}, p_{i,2}, p_{i,3}, p_{i,4}$ on channel availability and the values of the status vectors VV and LRU, the channel selector 42 detects a so-called victim channel $C_j$.

Finally, the distribution module 26 comprises a generator 44 for temporarily assigning a cache row to the data row comprising the word having the address @. This temporary assigning generator 44 assigns a cache row in a deterministic manner known per se based on the information of the set of address @ (defining the set) and the victim $C_j$ (defining the selected channel).

In view of the above, a possible architecture for the channel selector 42 is detailed in FIG. 8.

According to this architecture, the vector $M_i[1 \ldots 4]$ is supplied as an input of a first inverter 46 wherein the output is supplied, with the vector LRU[1 . . . 4], as an input of a first OR logical operator 48. This OR logical operator 48 thus supplies as an output a vector RLRU[1 . . . 4] wherein the coefficients are set to 1 if the corresponding channel has been used recently or if it is not available for the main memory area $M_i$ in question.

According to the same architecture, the vector $M_i[1 \ldots 4]$ is supplied as an input of a second inverter 50 wherein the output is supplied, with the vector VV[1 . . . 4], as an input of a second OR logical operator 52. This OR logical operator 52 thus supplies as an output a vector RVV[1 . . . 4] wherein the coefficients are set to "1" if the corresponding channel already contains a data row or if it is not available for the main memory area $M_i$ in question.

The vector RLRU[1 . . . 4] is supplied as an input of a first encoder 54 configured to compute and supply as an output the index of the first bit (i.e. coefficient) set to "0" in the vector RLRU[1 . . . 4]. It thus performs a function for selecting a channel from those available and not used recently (in this instance, the first in the test direction selected, this direction not being otherwise important). If all the bits of the vector RLRU[1 . . . 4] are set to "1", it returns a predetermined index, for example the default index RLRU[1] to simplify the logic diagram of the encoder 54, or an index chosen at random.

Similarly, the vector RVV[1 . . . 4] is supplied as an input of a second encoder 56 configured to compute and supply as an output the index of the first bit (i.e. coefficient) set to "0" in the vector RVV[1 . . . 4]. It thus performs a function for selecting a channel from those available and not filled (in this instance, the first in the test direction selected, this direction not being otherwise important). If all the bits of the vector RVV[1 . . . 4] are set to "1", it returns a predetermined index, for example the default index RVV[1] to simplify the logic diagram of the encoder 56, or an index chosen at random.

The output of the first encoder 54 is supplied as an input "1" of a first multiplexer 58, whereas the output of the second encoder 56 is supplied as an input "0" of said first multiplexer 58. Considering the vector RVV as having priority over the vector RLRU, the first multiplexer 58 transmits the result of the encoding 54 carried out on the vector RLRU if all the coefficients of the vector RVV are set to "1" and the result of the encoding 56 carried out on the vector RVV otherwise.

Moreover, the vector $M_i[1 \ldots 4]$ is supplied as an input of a third encoder 60 configured to compute and supply as an output the index of the first bit (i.e. coefficient) set to "1" in the vector $M_i[1 \ldots 4]$. It thus performs a function for selecting a channel from those available (in this instance, the first in the test direction selected, this direction not being otherwise important). If all the bits of the vector $M_i[1 \ldots 4]$ are set to "0", it returns a predetermined index, for example the default index $M_i[1]$ to simplify the logic diagram of the encoder 60, or an index chosen at random. It should be noted that, alternatively, the third encoder 60 could be replaced by an encoder identical to the encoders 54 and 56 but then preceded by an inverter: the result would be the same.

The output of the third encoder 60 is supplied as an input "1" of a second multiplexer 62, whereas the output of the first multiplexer 58 is supplied as an input "0" of the second multiplexer 62. Considering the vector RLRU as having priority over the vector $M_i$, the second multiplexer 62 transmits the result of the encoding 60 carried out on the vector $M_i$ if all the coefficients of the vector RLRU are set to "1" and the result transmitted by the first multiplexer 58 otherwise. The output of the channel selector 42 is thus that of the second multiplexer 62, i.e. a channel $C_j$ selected from the possible channels for the set and the main memory area in question.

The concrete example detailed above involves the drawback of reducing the number of channels available for a given main memory area. One solution then consists of applying a hash function to the bits of the address @ to determine the set identifier to be used. In this way and as described above, the number of collisions within the same set is limited by breaking the linearity of some access modes to the cache memory 16.

In this concrete example, when the cache memory 16 comprises the data word for which read or write access is sought, the operation thereof during the step 202 mentioned above remains unchanged in relation to that known from the prior art.

In this way, in read mode, the architecture of the cache memory 16 complies with that represented in FIG. 9. The set is retrieved from the address @ of the data word to be read and the tag values (i.e. the set of bits which, with the set of address @, fully identify the data row comprising the word sought in the cache memory 16) corresponding to this set in each of the channels $C_1$, $C_2$, $C_3$, $C_4$ and stored in the registry Reg of the cache memory 16 are compared to the tag of the address @. The result of these comparisons is supplied to an encoder 64 which retrieves this tag value and the channel $C_j$ comprising same. Using the set value and the selected channel $C_j$, the residual bits (DATA) of the data word to be read are detected in the cache memory 16. A concatenation module 66 then restores the data word D from the tag, the set and the residual bits detected in the cache memory.

In write mode, the architecture of the cache memory 16 complies with that represented in FIG. 10. The set is retrieved from the address @ of the data word to be updated in the cache memory 16 and the tag values corresponding to this set in each of the channels $C_1$, $C_2$, $C_3$, $C_4$ and stored in the registry Reg of the cache memory 16 are compared to the tag of the address @. The result of these comparisons is used to select (signal SEL) the channel $C_j$ comprising the tag of the address @. Using the set value and the selected channel $C_j$, the residual bits of the data word D to be updated are transmitted and stored (in DATA form) in the set (corresponding to the set) and channel selected.

A further concrete example of implementation of the invention will now be detailed in a more complex case than the previous one with reference to FIGS. 11 to 15: that of a NUCA (Non Uniform Cache Access) cache memory, i.e. a two-dimensional or three-dimensional cache memory with non-uniform access and a high number of cache banks, each cache bank being suitable for functioning independently of the others in read or in write mode according to a correspondence principle specific thereto: in other words, each cache bank may comprise a specific control logic. This NUCA cache memory is for example a higher level or last level cache.

In one advantageous embodiment, each cache bank is actually a complete standalone cache operating according to an associative correspondence principle with N-channel sets. In this respect, it is not necessary for the type of memory to be homogeneous from one cache bank to another in the proposed architecture. Furthermore, one or a plurality of status controllers responsible for scheduling the processing of queries and responses are associated with each standalone cache bank. The control is thus distributed in each cache bank, improving the scalability of the whole when the number of cache banks and processors using the cache memory 16 increases. Indeed, there is no point of contention in this architecture in terms of data read and write mode in the NUCA cache memory formed.

As illustrated in FIG. 11 in one particular two-dimensional case with 3 rows and 6 columns, the cache memory 16 comprises a large number of cache banks $Bk_{1,1}, \ldots Bk_{i,j}, \ldots Bk_{3,6}$ organized in a matrix and interconnected together by an integrated network-on-chip 70 also in matrix form. Access to this matrix network of cache banks is obtained via ports connected to at least some of the nodes of the integrated network-on-chip 70.

In one advantageous embodiment, each connection port to the cache memory 16 is associated with one of the main memory areas $M_1, \ldots, M_n$, where n=6 in FIG. 11. Each port may actually be associated with a microprocessor access in a multiprocessor system wherein, according to the applications executed, each microprocessor is associated with a main memory area $M_i$ suited to the requirements thereof.

In this embodiment, it is also suitable to split the distribution module 26 into a plurality of different and independent distribution modules $26_1, \ldots, 26_N$ as detailed with reference to FIG. 5, for example one per main memory area (N=n), or in other words one per connection port or per microprocessor of the multiprocessor system.

As illustrated in FIG. 12, each main memory area $M_i$ is associated with one or a plurality of main memory segments referenced $S_1, \ldots, S_7$ according to the requirements of each connection port to the cache memory 16. This association is freely defined and thus allows a degree of flexibility in the management of access to the cache memory 16.

Moreover, as illustrated in FIG. 13 and according to the invention, to each port associated with each identified main memory area $M_i$ at least one of the cache banks $Bk_{1,1}, \ldots Bk_{i,j}, \ldots Bk_{3,6}$ each considered to be an identified cache area is allocated in a configured and reconfigurable manner. As in the concrete example of implementation above, this configurable allocation may be implemented using a look-up table between the connection ports (or main memory areas) $M_1, \ldots, M_n$ and the cache banks $Bk_{1,1}, \ldots Bk_{i,j}, \ldots Bk_{3,6}$. In this way, for example, in FIG. 13, the dotted lines indicate that the cache banks $Bk_{2,1}$, $Bk_{2,2}$, $Bk_{3,1}$ and $Bk_{3,2}$ are allocated to the connection port associated with the main memory area $M_1$, and that the cache banks $Bk_{1,6}$, $Bk_{2,6}$ and $Bk_{3,6}$ are allocated to the connection port associated with the main memory area $M_6$.

FIG. 14 illustrates that the same cache bank can be allocated to a plurality of connection ports. In this way, for example, the dotted lines indicate that the cache banks $Bk_{2,1}$, $Bk_{2,2}$, $Bk_{3,1}$ and $Bk_{3,2}$ are allocated to the connection port associated with the main memory area $M_1$ and the cache banks $Bk_{3,2}$, $Bk_{3,3}$ and $Bk_{3,4}$ are allocated to the connection port associated with the main memory area $M_3$, the cache bank $Bk_{3,2}$ being common to these two connection ports. In this way, two microprocessors accessing the two connection ports may compete on the inputs of the common cache bank $Bk_{3,2}$. The most active microprocessor will tend to secure more inputs and thus have a larger temporary storage space in cache memory. This possibility of competition helps adapt the dynamic load offered by the invention but at a finer level of granularity. It should also be noted that the same microprocessor may compete with itself if it accesses two connection ports in conflict on a cache bank.

The manner whereby a connection port distributes the data between the cache banks allocated thereto is dependent on the distribution function used by the distribution module thereof. The sought properties of such a function are as follows:
- determinism: the same settings always produce the same result; this property is even necessary,
- uniformity: the access distribution should not prioritize one cache bank over another memory bank of the same cache area,
- cache area format configuration: this should be suitable for dynamic modification; this property is necessary, but it is possible to restrict the possible formats to simplify the distribution function.

This distribution function, including the management of the modification of the cache area format, may be implemented in the microprocessor part of the electronic chip 10 or in a separate functional block at the input of the integrated network-on-chip 70 leading to the cache banks, particularly at the connection ports.

In conclusion, each connection port to the NUCA cache memory 16 is responsible for a cache region defined in a freely configurable and reconfigurable manner by the cache banks thereof. This all takes place as if each connection port to the NUCA cache memory 16 exposed a different logical cache memory dynamically adapted to the task processed thereby, the logical cache memories actually possibly overlapping by means of common cache banks.

It is thus possible to create a S-NUCA (Static NUCA) cache memory wherein the registry is distributed inside the cache banks. The choice of a static distribution is also justified by the type of target application, particularly when the cache memory is three-dimensional as illustrated in FIG. 15: three-dimensional illustration makes it possible to reduce delays between accesses to the various cache banks, thus the performances are less sensitive to the positioning of the data inside the S-NUCA cache memory 16.

However, according to the invention, the cache memory 16 remains dynamically reconfigurable by adapting to the requirements of the coefficients of the look-up table mentioned above. However, it is necessary to envisage invalidating at least some of the data stored temporarily in allocated cache areas affected by changing cache bank distribution. For this purpose, it is possible to implement overall or selective invalidation, or invalidation based on a predetermined mechanism. Furthermore, the invalidation time may be reduced by buffer memory mechanisms storing the location of the modified data in the memory banks concerned by the change of distribution. In this way, although the cache areas formed in the cache memory 16 are of the S-NUCA type, they may change size and format dynamically in order to adapt to the load according to a large-scale granularity principle and compete with each other via common memory banks according to a small-scale granularity principle.

The three-dimensional cache memory 16 eventually obtained as illustrated in FIG. 15 comprises at least two overlaid layers of cache banks arranged on top of a computing layer 14 with multiple microprocessors arranged in a matrix below the cache bank layers.

Each microprocessor $14_{i,j}$ of the computing layer 14 accesses the three-dimensional cache memory 16 via a port $M_{i,j}$ associated with a main memory area wherein the corresponding cache banks are accessible by means of a three-dimensional integrated network-on-chip including vertical connections V. In this way, in particular, if a microprocessor $14_{i,j}$ seeks to access a different main memory area to that corresponding to the port $M_{i,j}$ with which it is associated, it needs to do so via at least one further microprocessor. It is thus assumed that an integrated network-on-chip connects the microprocessors of the computing layer 14 together and that it integrates a routing function based on the memory addresses so as to associate each port with a main memory area.

In this three-dimensional architecture, the distribution function associated with a main memory area is advantageously situated in a separate functional block associated with the corresponding port $M_{i,j}$.

The concrete example of implementation illustrated using FIGS. 11 to 15 demonstrates that the invention may be implemented in a substantially parallel multilayer integrated on-chip multiprocessor architecture using known three-dimensional stacking techniques, particularly in terms of the design of three-dimensional circuits on silicon wafer making use of new stacking techniques based on TSV vias (Through Silicon Vias). This three-dimensional multiprocessor architecture may be used in the context of high-performance computing applications requiring a high computing power and a memory size of several Gigabytes since it enables high-speed access to the onboard cache memory on top of the computing layers. It may also be envisaged in onboard systems.

Such a three-dimensional cache memory on chip architecture is generally designed to meet five main requirements:
- offering a very high-speed bandwidth between the computing layers and those assigned to the cache memory,
- adapting to the memory requirements of the underlying multiprocessor system by envisaging the possibility of stacking a plurality of memory layers,
- reducing production costs by maximizing reuse of the same memory circuit, that used for a plurality of multiprocessor network-on-chip circuits by means of the possibility of obtaining unused connections,
- providing fault tolerance within the circuit by minimizing the effect on the functionalities and performances thereof, by means of possible isolation of defective modules, and
- rendering the general energy consumption of the circuit modular.

However, one of the stumbling blocks preventing the transition to several hundred or thousands of computing elements in such an architecture is the access to the main memory situated outside the chip. It is thus obvious that a system on a chip such as any of those described above, by helping optimize the use of cache memory, generally enhances the throughput to the memory and limits requests using the main memory.

As a general rule, it is obvious that the systems on a chip described above are suitable for optimizing the use of an associated cache memory, directly (level one) or indirectly (higher level), with one or a plurality of microprocessors by rendering same reconfigurable as required, by means of a set of settings suitable for being updated by the microprocessors themselves.

It should be noted that the invention is not limited to the embodiments described above. It will be obvious to those skilled in the art that various modifications may be made to the embodiments described above, in the light of the teaching disclosed herein. In the claims hereinafter, the terms used should not be interpreted as limiting the claims to the embodiments described in the present description, but should be interpreted to include any equivalents intended to be covered by the claims due to the wording thereof and which can be envisaged by those skilled in the art by applying their general knowledge to the implementation of the teaching disclosed herein.

The invention claimed is:

1. A system for managing correspondence between a cache memory, subdivided into a plurality of cache areas each integrating its specific control logic, and a main memory, subdivided into a plurality of memory areas each specifically associated with a software application of a set of concurrent software applications, comprising means for temporarily assigning, to any data row stored in one of the areas of the main memory, a cache row of the cache memory, wherein the cache memory includes plural connection ports and each of the main memory areas being associated with a unique connection port of the cache memory, wherein the unique port is dedicated to a software application that corresponds to the main memory area, the system comprising:
   means for allocating, to each area of the main memory, and to each connection port that allows an access to the cache memory, at least one area of the cache memory, wherein the allocation means is different from control logics of the cache areas;
   means for generating and updating settings of the allocation by activating the allocation means according to requirements of concurrent applications;
   temporary assigning means for determining a cache row to be assigned to a data row based on the allocation settings and in one of the cache areas allocated to the main memory area wherein the data row is stored.

2. An electronic chip comprising a cache memory and a system for managing correspondence according to claim 1.

3. The electronic chip according to claim 2, wherein the temporary assigning means is implemented in the cache memory and comprises at least one allocation detector receiving as an input the allocation settings and supplying as an output an indication of correspondences between the main memory areas and the cache areas.

4. The electronic chip according to claim 3, wherein the temporary assigning means further comprises at least one distribution module receiving as an input an address of a data row stored in the main memory and supplying as an output selection of a cache row based on the correspondence indication supplied by the allocation detector.

5. The electronic chip according to claim 4, wherein the distribution module is microprogrammed for use of a deterministic configurable function for supplying a cache row from the address of a data row stored in the main memory.

6. The electronic chip according to claim 5, wherein the function used by the distribution module is a hash function, or a modulo function, or an XOR-based hash function, or a combination of these functions.

7. The electronic chip according to claim 4, wherein the temporary assigning means comprises:
   a plurality of allocation detectors accessible in parallel,
   a plurality of distribution modules for simultaneously receiving a plurality of addresses of data rows stored in the main memory, and
   interfaces for routing input and/or output data of the pluralities of allocation detectors and distribution modules.

8. The electronic chip according to claim 1, wherein the cache memory is a memory with multiple memory banks organized according to a two-dimensional or three-dimensional topology, each cache area being a memory bank of the cache memory suitable for comprising a specific control logic.

9. The electronic chip according to claim 8, wherein the memory banks of the cache memory are interconnected together by a two-dimensional or three-dimensional network-on-chip structure, the electronic chip comprising a plurality of access ports to this network-on-chip structure, one access port being defined respectively for each of the areas of the main memory.

10. A method for managing correspondence between a cache memory, subdivided into a plurality of cache areas each integrating its specific control logic, and a main memory, subdivided into a plurality of memory areas each specifically associated with execution of a software application of a set of concurrent running software applications, the method comprising:
   temporarily assigning, to any data row stored in one of the areas of the main memory, a cache row of the cache memory, wherein the cache memory includes plural connection ports and each of the main memory areas being associated with a unique connection port of the cache memory, wherein the port is dedicated to the execution of the software application that corresponds to the main memory area;
   allocating, to each area of the main memory, and to each connection port that allows an access to the cache memory, at least one area of the cache memory, using means that are different from control logics of the cache areas,
   generating and updating settings in respect of the allocation according to requirements of the concurrent applications;
   temporary assigning a cache row to a data row performed based on the allocation settings and in one of the cache areas allocated to the main memory area wherein the data row is stored.

11. The method for managing correspondence according to claim 10, wherein each area of the main memory is identified by values of a predetermined set of address bits, or most significant bits, from the address bits using which the addresses of the data stored in the main memory are expressed.

12. The method for managing correspondence according to claim 10, wherein the allocation to two different areas of the main memory of at least one common area of the cache memory is authorized and configurable using the allocation settings.

13. A computer program on a non-transitory computer-readable medium executable by a processor, comprising instructions for executing the method for managing correspondence according to claim 10, when the program is executed on a computer.

* * * * *